P. LEAR.
Improvement in Chest-Protectors.
No. 5,110.
Reissued Oct. 22, 1872.
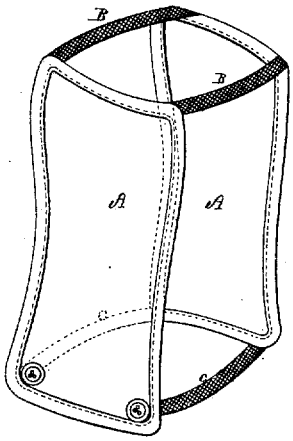
Witnesses.
L. N. Möller
J. R. Snow
Peter Lear.
by his attorney.
R. H. Lacey
A.M. PHOTO-LITHOGRAPHIC CO. N.Y. (OSBORNE'S PROCESS.)

UNITED STATES PATENT OFFICE.

PETER LEAR, OF BOSTON, MASSACHUSETTS.

IMPROVEMENT IN CHEST-PROTECTORS.

Specification forming part of Letters Patent No. 112,258, dated February 28, 1871; reissue No. 5,110, dated October 22, 1872.

*To all whom it may concern:*

Be it known that I, PETER LEAR, of Boston, of the county of Suffolk and State of Massachusetts, have made an invention of a new and useful Improvement in Chest-Protectors and analagous articles; and do hereby declare the following to be a full, clear, and exact description thereof, due reference being had to the accompanying drawing, which is a perspective representation of my invention.

My present improvement has reference to articles of wearing apparel denominated chest-protectors, the particular class of such articles to which my invention relates being that composed of two pads of a warm material, one to cover the chest of the wearer and the other the upper portion of the back between the shoulders, the two pads being united at opposite upper corners by straps, which serve as suspensories whereby to support the article about the wearer's neck.

A source of considerable annoyance and discomfort has been found in the use of these chest-protectors from the fact that the pads, possessing no means of securing their lower ends about the wearer's body, are constantly slipping out of place, and wrinkling, and working upward to such an extent as to defeat their purpose, and render them disagreeable and comparatively useless. My present improvement, though to appearance trifling, yet goes far to perfect these chest-protectors, and consists in uniting the two pads at or near their lower ends by straps, which may be composed either of an unelastic fabric or webbing so applied at one end as to button to the pad, or of an elastic material attached either by buttons or sewing at both ends directly to the pad, the elasticity of the latter material enabling the article to be passed over the head and about the body, if desired, without recourse to buttons. These straps, however applied, serve a very useful purpose, and convert a chest-protector into a comfortable and useful means of protection against wind and cold, as they confine or retain the pads in proper place about the wearer's body.

The accompanying sketch represents the two pads of the article at A A, and the two upper suspension or shoulder straps at B B, the lower or waist-straps being shown at C C in such drawing as attached in a suitable manner to the lower opposite corners of the pads A A. It is not necessary that these straps should be secured to the extreme lower ends of the pads; but it will undoubtedly be found that the nearer they approach such ends the more beneficial will be their action.

As I intend making the rear pad of sufficient length to cover the entire length of the spine of the wearer, I denominate the article a lung and spine protector.

I claim—

As a new or improved article of manufacture, the chest or lung and spine protector, constructed as herein shown and described—viz., with connecting-straps at the tops and others at or near the bottoms of the two pads—all being substantially as set forth.

PETER LEAR.

Witnesses:
R. H. EDDY,
J. R. SNOW.